United States Patent [19]

Kahle et al.

[11] Patent Number: 5,978,896

[45] Date of Patent: Nov. 2, 1999

[54] METHOD AND SYSTEM FOR INCREASED INSTRUCTION DISPATCH EFFICIENCY IN A SUPERSCALAR PROCESSOR SYSTEM

[75] Inventors: James Allan Kahle; Chin-Cheng Kau; David Steven Levitan, all of Austin; Aubrey Deene Ogden, Round Rock, all of Tex.

[73] Assignee: International Business Machines Corporation, Armonk, N.Y.

[21] Appl. No.: 08/289,801

[22] Filed: Aug. 12, 1994

Related U.S. Application Data

[63] Continuation of application No. 08/001,867, Jan. 8, 1993, abandoned.

[51] Int. Cl.[6] .................................................. G06F 9/38
[52] U.S. Cl. ......................... 712/23; 712/200; 712/208; 712/214
[58] Field of Search ................................. 395/800, 375, 395/650

[56] References Cited

U.S. PATENT DOCUMENTS

| | | | |
|---|---|---|---|
| 4,081,612 | 3/1978 | Hafner ..................................... | 370/60 |
| 4,261,035 | 4/1981 | Raymond ................................ | 395/325 |
| 4,754,457 | 6/1988 | Bright et al. ........................... | 371/47.1 |
| 4,819,151 | 4/1989 | May ........................................ | 395/650 |
| 5,127,091 | 6/1992 | Boufarah et al. ...................... | 395/375 |
| 5,202,975 | 4/1993 | Rasbold et al. ........................ | 395/500 |
| 5,283,899 | 2/1994 | Cook et al. ............................. | 395/650 |

FOREIGN PATENT DOCUMENTS 42 16 905  1/1993  European Pat. Off. .

OTHER PUBLICATIONS

"Control System for Instruction Processing Order", Patent Abstracts of Japan, vol. 6, No. 96, Jun. 4, 1982.

*Primary Examiner*—Meng-Ai T. An
*Assistant Examiner*—Walter D. Davis, Jr.
*Attorney, Agent, or Firm*—Casimer K. Salys; Andrew J. Dillon

[57] ABSTRACT

A method and system for increased instruction dispatch efficiency in a superscalar processor system having an instruction queue for receiving a group of instructions in an application specified sequential order and an instruction dispatch unit for dispatching instructions from an associated instruction buffer to multiple execution units on an opportunistic basis. The dispatch status of instructions within the associated instruction buffer is periodically determined and, in response to a dispatch of the instructions at the beginning of the instruction buffer, the remaining instructions are shifted within the instruction buffer in the application specified sequential order and a partial group of instructions are loaded into the instruction buffer from the instruction queue utilizing a selectively controlled multiplex circuit. In this manner additional instructions may be dispatched to available execution units without requiring a previous group of instructions to be dispatched completely.

8 Claims, 4 Drawing Sheets

METHOD AND SYSTEM FOR INCREASED INSTRUCTION DISPATCH EFFICIENCY IN A SUPERSCALAR PROCESSOR SYSTEM

This is a continuation, of application Ser. No. 08/001,867, filed Jan. 8, 1993, abandoned.

BACKGROUND OF THE INVENTION

1. Technical Field

The present invention relates in general to improved data processing systems and in particular to improvements in instruction dispatch efficiency in a data processing system. Still more particularly, the present invention relates to a method and system for increased instruction dispatch efficiency in a superscalar processor system.

2. Description of the Related Art

Designers of modern state-of-the-art data processing systems are continually attempting to enhance the performance aspects of such systems. One technique for enhancing data processing system efficiency is the achievement of short cycle times and a low Cycles-Per-Instruction (CPI) ratio. An excellent example of the application of these techniques to an enhanced data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a superscalar implementation, which means that multiple instructions are issued and executed simultaneously.

The simultaneous issuance and execution of multiple instructions requires independent functional units that can execute concurrently with a high instruction bandwidth. The RS/6000 system achieves this by utilizing separate branch, fixed point and floating point processing units which are pipelined in nature. In such systems a significant pipeline delay penalty may result from the execution of conditional branch instructions. Conditional branch instructions are instructions which dictate the taking of a specified conditional branch within a application in response to a selected outcome of the processing of one or more other instructions. Thus, by the time a conditional branch instruction propagates through a pipeline queue to an execution position within the queue, it will have been necessary to load instructions into the queue behind the conditional branch instruction prior to resolving the conditional branch in order to avoid run-time delays.

Another source of delays within superscalar processor systems is the fact that such systems typically execute multiple tasks simultaneously. Each of these multiple tasks typically has a effective or virtual address space which is utilized for execution of that task. Locations within such a effective or virtual address space include addresses which "map" to a real address within system memory. It is not uncommon for a single space within real memory to map to multiple effective or virtual memory addresses within a multiscalar processor system. The utilization of effective or virtual addresses by each of the multiple tasks creates additional delays within a multiscalar processor system due to the necessity of translating these addresses into real addresses within system memory, so that the appropriate instruction or data may be retrieved from memory and placed within an instruction queue for dispatching to one of the multiple independent functional units which make up the multiscalar processor system.

In modern superscalar processors groups of instructions are often dispatched from the instruction buffer in a priority order as execution units are available to process those instructions. Often the instructions at the beginning of an instruction buffer are dispatched and the instructions within the remainder of that group remain in the buffer for several cycles waiting for execution units or other resources. Additionally, there may be available execution units of a type not required for the remaining instructions. It should thus be apparent that instruction dispatch efficiency may be increased if a method and system were available for shifting instructions within an instruction buffer in an application specified sequential order, such that additional instructions may be placed within the buffer for dispatch to execution units.

SUMMARY OF THE INVENTION

It is therefore one object of the present invention to provide an improved data processing system.

It is another object of the present invention to provide improved instruction dispatch efficiency in a data processing system.

It is yet another object of the present invention to provide an improved method and system for increased instruction dispatch efficiency in a superscalar processor system.

The foregoing objects are achieved as is now described. The method and system of the present invention permit increased instruction dispatch efficiency in a superscalar processor system having an instruction queue for receiving a group of instructions in an application specified sequential order and an instruction dispatch unit for dispatching instructions from an associated instruction buffer to multiple execution units on an opportunistic basis. The dispatch status of instructions within the associated instruction buffer is periodically determined and, in response to a dispatch of the instructions at the beginning of the instruction buffer, the remaining instructions are shifted within the instruction buffer in the application specified sequential order and a partial group of instructions are loaded into the instruction buffer from the instruction queue, utilizing a selectively controlled multiplex circuit. In this manner additional instructions may be dispatched to available execution units without requiring a previous group of instructions to be dispatched completely.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
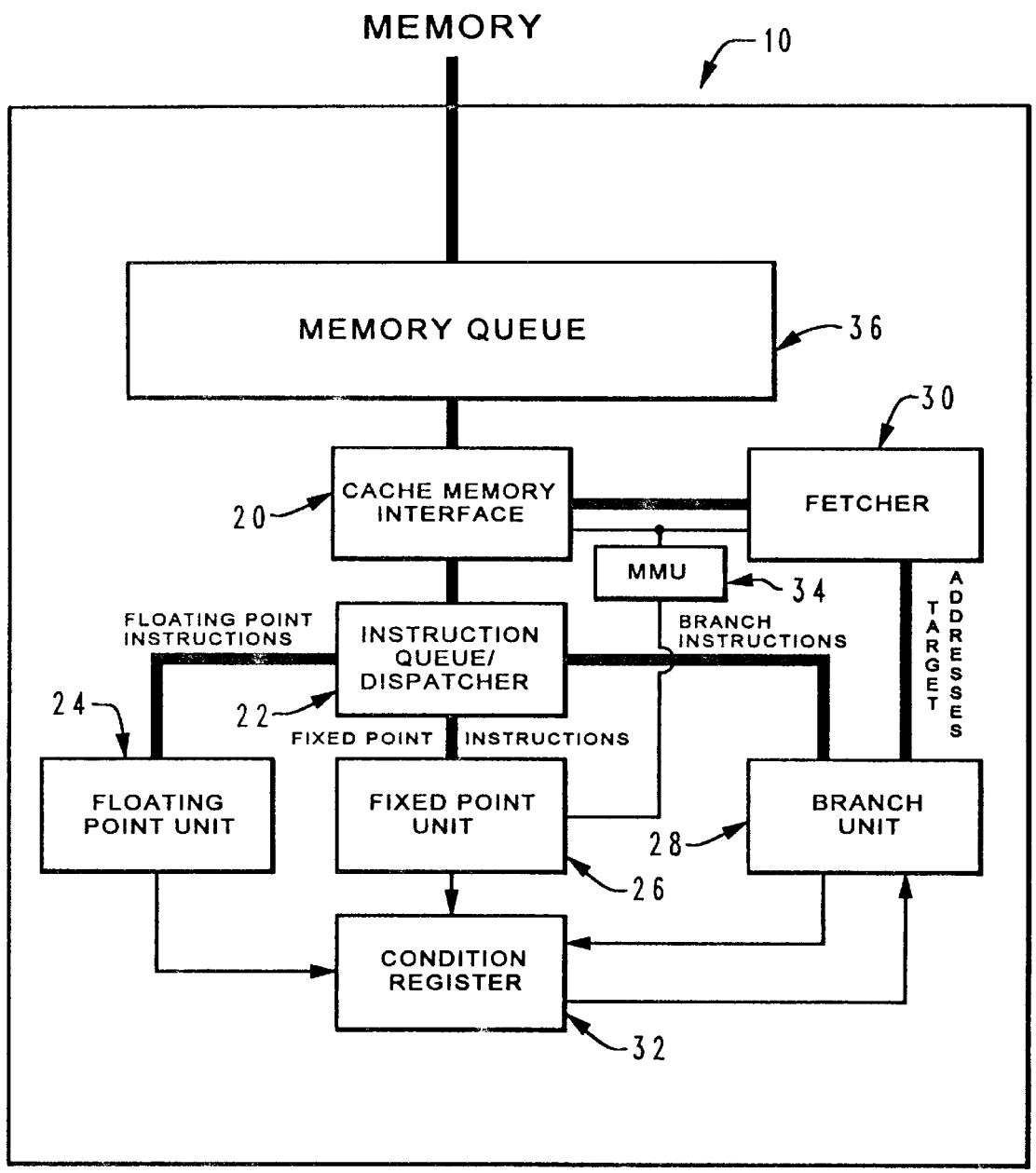
FIG. 1 is a high level block diagram of a superscalar processor which may be utilized to implement the method and system of the present invention.

With reference now to the figures and in particular with reference to FIG. 1, there is depicted a high level block diagram of a superscalar processor 10 which may be utilized to implement the method and system of the present invention. As illustrated, superscalar processor 10 preferably includes a memory queue 36 which may be utilized to store data, instructions and the like which is read from or written to system memory to superscalar processor 10. Data or instructions stored within memory queue 36 are preferably accessed utilizing cache/memory interface 20 in a method well known to those having skill in the art. The sizing and utilization of cache memory systems ia well known subspecialty within the data processing art and not addressed within the present application. However, those skilled in the art will appreciate that by utilizing modern associated cache techniques a large percentage of memory accesses may be achieved utilizing data temporarily stored within cache/memory interface 20.

Instructions from cache/memory interface 20 are typically loaded into instruction queue/dispatcher 22 which preferably includes a plurality of queue positions. In a typical embodiment of a superscalar computer system the instruction queue may include eight queue positions and thus, in a given cycle, between zero and eight instructions may be loaded into instruction queue/dispatcher 22, depending upon how many valid instructions are passed by cache/memory interface 20 and how much space is available within instruction queue/dispatcher 22.

As is typical in such superscalar processor systems, instruction queue/dispatcher 22 is utilized to dispatch instructions to multiple execution units. As depicted within FIG. 2, superscalar processor 10 includes a floating point processor unit 24, a fixed point processor unit 26, and a branch processor unit 28. Thus, instruction queue/dispatcher 22 may dispatch between zero and three instructions during a single cycle, one to each execution unit.

In addition to sequential instructions dispatched from instruction queue/dispatcher 22, so-called "conditional branch instructions" may be loaded into instruction queue/dispatcher 22 for execution by the branch processor. A conditional branch instruction is an instruction which specifies an associated conditional branch to be taken within the application in response to a selected outcome of processing one or more sequential instructions. In an effort to minimize run-time delay in a pipelined processor system, such as superscalar processor 10, the presence of a conditional branch instruction within the instruction queue/dispatcher is detected and an outcome of the conditional branch is predicted. As should be apparent to those having skill in the art when a conditional branch is predicted as "not taken" the sequential instructions within the instruction queue/dispatcher simply continue along a current path and no instructions are altered. However, if the prediction as to the occurrence of the branch is incorrect, the instruction queue/dispatcher must be purged of sequential instruction, which follow the conditional branch instruction in program order and target instructions must be fetched. Alternately, if the conditional branch is predicted as "taken" then the target instructions are fetched and utilized to follow the conditional branch, if the prediction is resolved as correct. And of course, if the prediction of "taken" is incorrect the target instructions must be purged and the sequential instructions which follow the conditional branch instruction in program order must be retrieved.

As illustrated, superscalar processor 10 also preferably includes a condition register 32. Condition register 32 is utilized to temporarily store the results of various comparisons which may occur utilizing the outcome of sequential instructions which are processed within superscalar processor 10. Thus, floating point processor unit 24, fixed point processor unit 26 and branch processor unit 28 are all coupled to condition register 32. The status of a particular condition within condition register 32 may be detected and coupled to branch processor unit 28 in order to generate target addresses, which are then utilized to fetch target instructions in response to the occurrence of a condition which initiates a branch.

Thereafter, a branch processor unit 28 couples target addresses to fetcher 30. Fetcher 30 calculates fetch addresses for the target instructions necessary to follow the conditional branch and couples those fetch addresses to cache/memory interface 20. As will should appreciated by those having skill in the art, if the target instructions associated with those fetch addresses are present within cache/memory interface 20, those target instructions are loaded into instruction queue/dispatcher 22. Alternately, the target instructions may be fetched from system memory 18 and thereafter loaded into instruction queue/dispatcher 22 from cache/memory interface 20 after a delay required to fetch those target instructions.

As those skilled in the art will appreciate, each task within superscalar processor 10 will typically have associated therewith an effective or virtual memory space and instructions necessary to implement each task will be set forth within that space utilizing effective or virtual addresses. Thus, fetcher 30 must be able to determine the real address for instructions from the effective addresses utilized by each task. As described above, prior art implementations of fetcher 30 typically either incorporate a complex translation lookaside buffer (TLB), sequence register and multiple translation algorithms or, alternately, such instruction fetchers are required to access a memory management unit (MMU) having such complex translation capability in order to determine real instruction addresses from effective or virtual instruction addresses.

Also depicted within superscalar processor 10 is memory management unit (MMU) 34. Memory management unit, as will be described in greater detail herein, preferably includes a translation lookaside buffer (TLB) and all necessary registers and translation algorithms which may be utilized to translate each effective address within superscalar processor 10 into real address within system memory. Fetcher units typically have a very low priority for accessing a memory management unit (MMU) and therefore some delay is expected in the obtaining of real instruction address utilizing a memory management unit (MMU).

Referring now to FIGS. 2a–2d, there are depicted a series of high level block diagrams of an instruction control unit 50 which illustrate the processing of a series of instructions in accordance with the method and system of the present invention. As illustrated, instruction control unit 50 preferably includes an instruction queue 52 which is capable of receiving a group of four instructions from cache in an application specified sequential order. These instructions are then transferred, utilizing known data processing techniques, to an instruction buffer 54 for dispatching to a plurality of execution units. In accordance with an important feature of the present invention a plurality of multiplex circuits 56, 58, 60 and 62 are interposed between instruction queue 52 and instruction buffer 54 and are utilized, in a manner which will be explained in greater detail herein, to effectively shift instructions within instruction buffer 54, in a manner which greatly increases the efficiency of instruction dispatch. As illustrated within FIG. 2a a group of four instructions A, B, C, and D have been loaded within instruction buffer 54 and are ready for dispatch. A second group of instructions E, F, G, and H are staged within instruction queue 52 and are ready to be loaded into instruction buffer 54, following a dispatch of the instructions within instruction buffer 54.

Figure 2A:
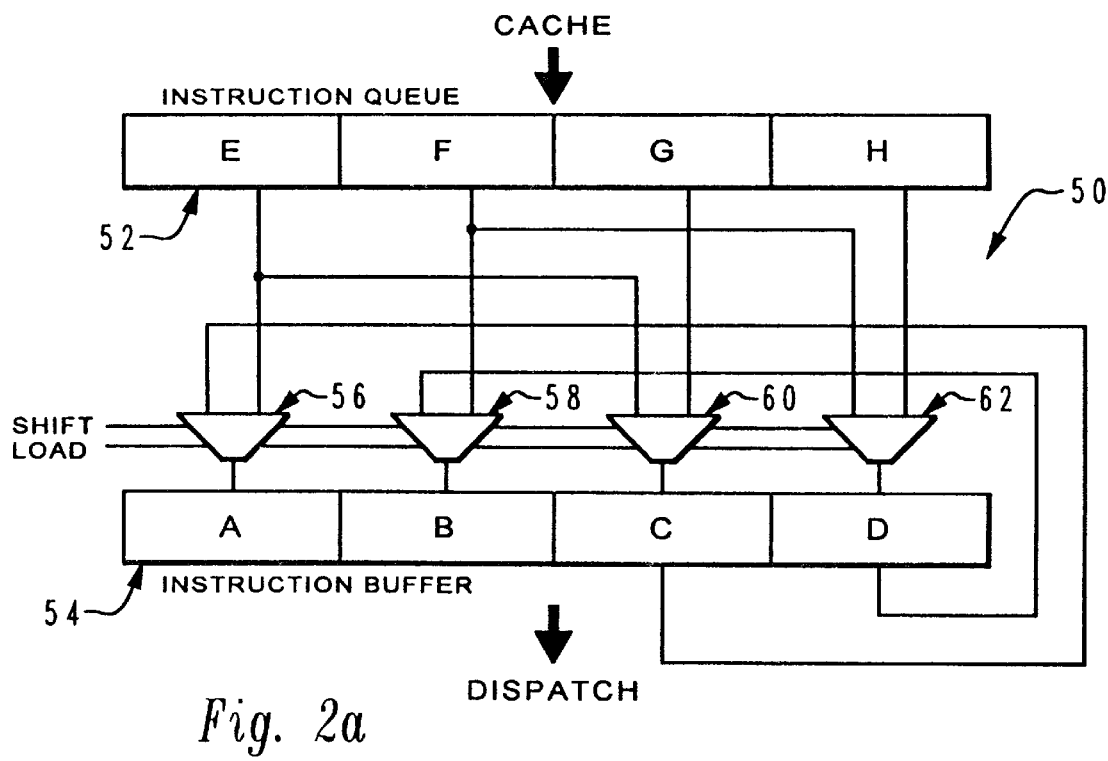
FIGS. 2a–2d are a series of high level block diagrams of an instruction control unit which illustrate the processing of a series of instructions in accordance with the method and system of the present invention.
Figure 2B:
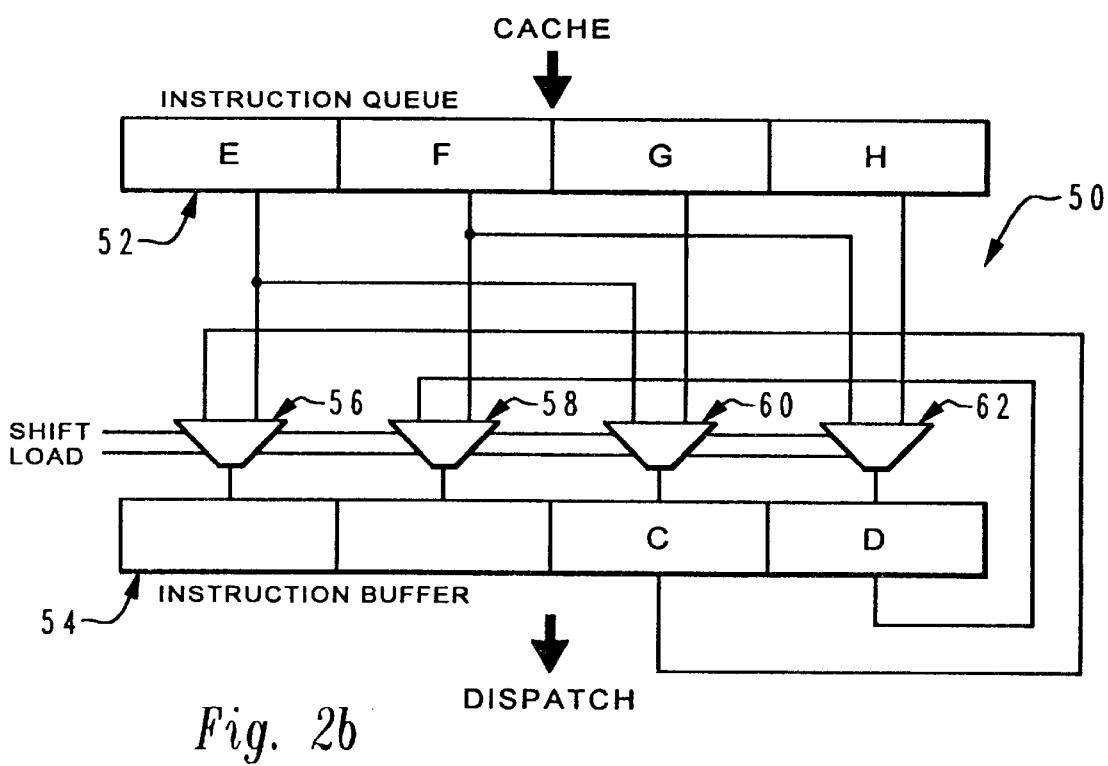

Referring now to FIG. 2b, it may be seen that instructions A and B have been dispatched, while instructions C and D await the availability of a particular type of execution unit or other asset necessary to dispatch those instructions completely. In accordance with the techniques utilized by known superscalar processor systems, instructions E, F, G and H will not be loaded into instruction buffer 54 until the completion of the dispatch of instructions C and D. This results in an inefficiency in instruction dispatch in that execution units or assets may be available which permit the dispatching of additional instructions; however, systems in which groups of instructions are simultaneously dispatched prohibits the dispatching of additional instructions from instruction queue 52 into instruction buffer 54, until all of the instructions within instruction buffer 54 have been completely dispatched.

Figure 2C:
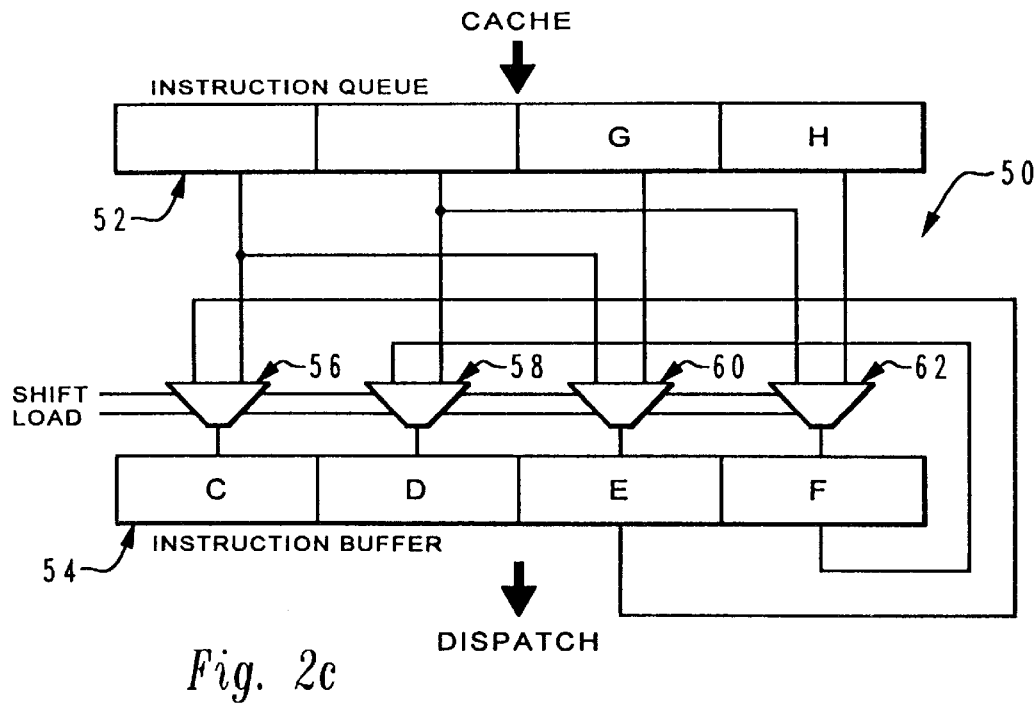

With reference now to FIG. 2c, the method and system of the present invention whereby instruction dispatch efficiency may be increased is illustrated. As depicted within FIG. 2c, instructions C and D have been shifted, utilizing multiplex circuits 56 and 58, as controlled by an associated "SHIFT" signal, into the first two positions within instruction buffer 54. Next, instructions E and F are loaded into the trailing positions within instruction buffer 54 in parallel, utilizing multiplex circuits 60 and 62. Thus, as is illustrated within FIG. 2c, the selective operation of the depicted multiplex circuits permits instruction buffer 54 to be shifted and loaded with instructions C, D, E and F, permitting instruction buffer 54 to be completely filled within instructions which are pending dispatch. In this manner the dispatching of instructions to available execution units is greatly enhanced.

Figure 2D:
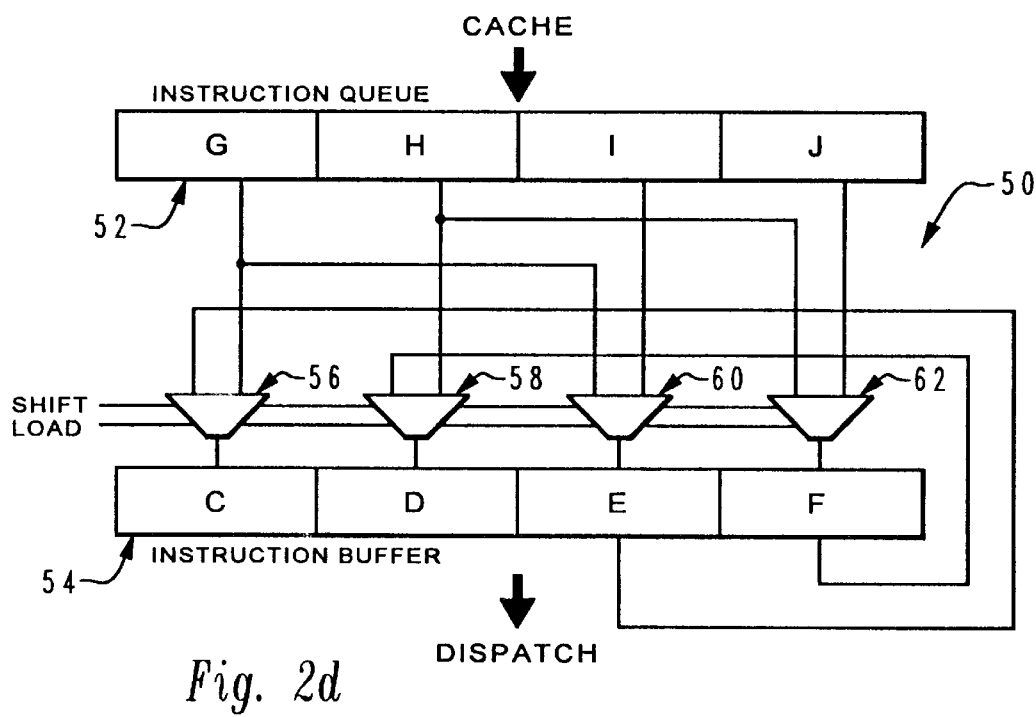

Finally, as depicted in FIG. 2d, the instructions within instruction queue 52 have been reloaded from cache, writing over the previous instructions therein and loading instructions G, H, I, and J. Thus, it may be seen that the instructions within instruction buffer 54 have been shifted and a portion of the group of four instructions within instruction queue 52 have been loaded therein in parallel, maintaining the application specified sequential order of those instructions, while greatly enhancing the efficiency of the instruction dispatch within instruction control unit 50.

Figure 3:
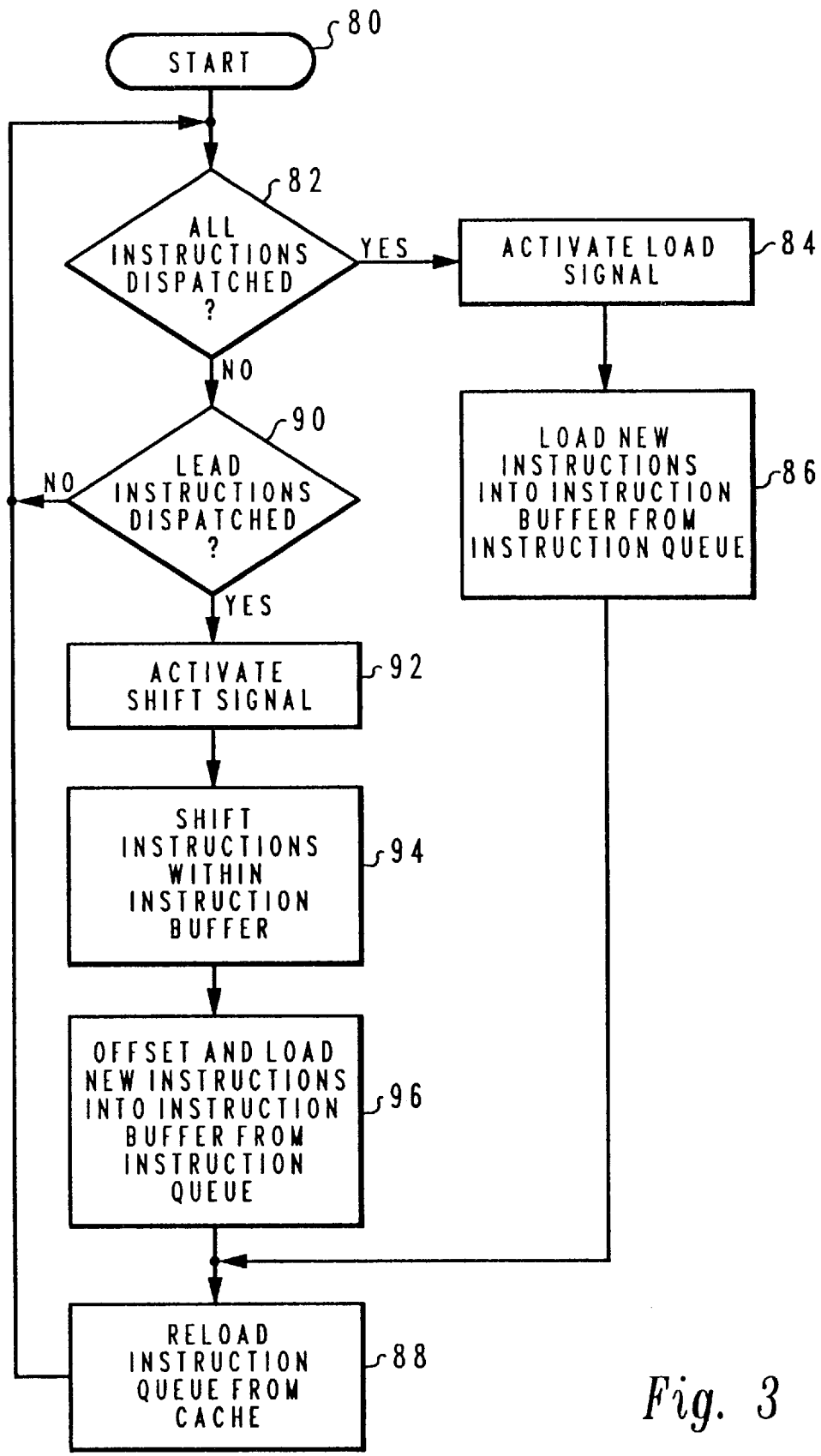
FIG. 3 is a high level logic flowchart which depicts a process for implementing the method and system of the present invention.

Finally, with reference to FIG. 3, there is depicted a high level logic flowchart which illustrates a process for implementing the method and system of the present invention. As depicted, the process begins at block 80 and thereafter passes to block 82. Block 82 illustrates the periodic determination of whether or not all instructions within instruction buffer 54 (see FIGS. 2a–2d) have been dispatched. If so, the process passes to block 84. Block 84 illustrates the activation of the "LOAD" signal, permitting the group of instructions within instruction queue 52 to be loaded directly into instruction buffer 54. Thereafter, as described above, block 86 depicts the loading of a new group of instructions into the instruction buffer from the instruction queue. Thereafter, the process passes to block 88. Block 88 illustrates the reloading of the instruction queue from cache and the process then returns, in an iterative fashion, to block 82.

Still referring to block 82, in the event all instructions within instruction buffer 54 have not been dispatched, the process passes to block 90. Block 90 illustrates a determination of whether or not the lead instructions have been dispatched. That is, those instructions which must be initially dispatched in the application specified sequential order. Those skilled in the art will appreciate that the advantages of increased instruction dispatch efficiency may not contribute to overall system efficiency if trailing instructions are dispatched prior to leading instructions, due to the complexity of maintaining instruction dependency control. However, in systems in which instruction dependency control can be maintained, the present method and system may be applied whenever any instruction has been dispatched from any position within the instruction buffer without regard to the dispatch status of the preceding instructions. In the event the lead instructions within the group of instructions within instruction buffer 54 have not been dispatched, the process returns in an iterative fashion to block 82, to once again determine whether or not all instructions have been dispatched or, thereafter, to determine whether or not the lead instructions have been subsequently dispatched.

Still referring to block 90, in the event the lead instructions within the group within instruction buffer 54 have been dispatched, the process passes to block 92. Block 92 illustrates the activation of the "SHIFT" signal. Thereafter, the process passes to block 94. Block 94 illustrates the shifting of the remaining instructions within instruction buffer 54 into the lead instruction positions, as described above with respect to FIG. 2c. Next, the process passes to block 96. Block 96 illustrates the offsetting and loading of new instructions into the trailing positions of instruction buffer 54, from instruction queue 52, as described above. Thereafter, the process passes to block 88, which once again illustrates the reloading of the instruction queue from cache. The process then returns to block 82, in an iterative fashion.

Upon reference to the foregoing those skilled in the art will appreciate that by providing the simple expedient of a series of multiplex circuits which are selectively controlled in response to the dispatching of instructions from an instruction buffer, the Applicants herein have provided a technique whereby the instruction dispatch efficiency within a superscalar processor may be greatly enhanced by placing additional instructions within the instruction buffer in response to a partial dispatch of selected instructions therein, making additional instructions available for possible dispatch to execution units without the requirement of completion of the dispatch of a previous group of instructions.

While the invention has been particularly shown and described with reference to a preferred embodiment, it will be understood by those skilled in the art that various changes in form and detail may be made therein without departing from the spirit and scope of the invention.

We claim:

1. A method for increased instruction dispatch efficiency in a superscalar processor system having an instruction queue for receiving instructions in an application specified sequential order and loading a group of instructions in parallel into an associated instruction buffer and an instruction dispatch unit for dispatching instructions from said associated instruction buffer to a plurality of execution units on an opportunistic basis, said method comprising the steps of:

periodically determining if an instruction within a first group of instructions within said associated instruction buffer has been dispatched to one of said plurality of execution units;

serially shifting remaining instructions within said associated instruction buffer in said application specified sequential order in response to a determination that an instruction within said first group of instructions within said associated instruction buffer has been dispatched; and selectively loading said associated instruction buffer with an additional group of instructions in parallel in said application specified sequential order utilizing only a portion of a second group of instructions within said instruction queue in response to said shifting of said remaining instructions.

2. The method for increased instruction dispatch efficiency in a superscalar processor system according to claim 1, wherein said instruction queue receives a group of four instructions in an application specified sequential order and wherein said step of periodically determining if an instruction within said first group of instructions within said associated instruction buffer has been dispatched to one of said plurality of execution units comprises the step of periodically determining if a first two of said group of four instructions within said first group of instructions have been dispatched to said plurality of execution units.

3. The method for increased instruction dispatch efficiency in a superscalar processor system according to claim 2, wherein said step of selectively loading said associated instruction buffer with an additional group of instructions in parallel in said application specified sequential order utilizing only a portion of a second group of instructions within said instruction queue in response to said shifting of said remaining instructions comprises the step of selectively loading said associated instruction buffer with two instructions in parallel from said second group of instructions in said application specified sequential order in response to said shifting of said remaining instructions.

4. An instruction shift mechanism for increased instruction dispatch efficiency in a superscalar processor system having an instruction queue for receiving instructions in an application specified sequential order and loading a group of instructions in parallel into an associated instruction buffer and an instruction dispatch unit for dispatching instructions from said associated instruction buffer to a plurality of execution units on an opportunistic basis, said instruction shift mechanism comprising:

means coupled to said associated instruction buffer for determining if an instruction within a first group of instructions within said associated instruction buffer has been dispatched to one of said plurality of execution units;

means coupled to said associated instruction buffer for serially shifting remaining instructions within said associated instruction buffer in said application specified sequential order in response to a determination that an instruction within said first group of instructions within said associated instruction buffer has been dispatched; and means coupled to said associated instruction buffer for selectively loading said associated instruction buffer with an additional group of instructions in parallel in said application specified sequential order utilizing only a portion of a second group of instructions within said instruction queue in response to said shifting of said remaining instructions.

5. The instruction mechanism for increased instruction dispatch efficiency according to claim 4, wherein said instruction queue receives a group of four instructions in an application specified sequential order and wherein said means for determining if an instruction within said first group of instructions within said associated instruction buffer has been dispatched to one of said plurality of execution units comprises means for determining if a first two of said group of four instructions within said first group of instructions have been dispatched to said plurality of execution units.

6. The instruction mechanism for increased instruction dispatch efficiency according to claim 5, wherein said means for selectively loading said associated instruction buffer with an additional group of instructions in parallel in said application specified sequential order utilizing only a portion of a second group of instructions within said instruction queue in response to said shifting of said remaining instructions comprises means for selectively loading said associated instruction buffer with two instructions from said second group of instructions in parallel in said application specified sequential order in response to said shifting of said remaining instructions.

7. The instruction mechanism for increased instruction dispatch efficiency according to claim 4, wherein said means for shifting remaining instructions within said associated instruction buffer in said application specified sequential order in response to a determination that an instruction within said first group of instructions within said associated instruction buffer has been dispatched comprises first multiplex means.

8. The instruction mechanism for increased instruction dispatch efficiency according to claim 4, wherein said means for selectively loading said associated instruction buffer with an additional group of instructions in parallel in said application specified sequential order utilizing only a portion of a second group of instructions within said instruction queue in response to said shifting of said remaining instructions comprises second multiplex means.

* * * * *